US005572244A

United States Patent [19]

Drake et al.

[11] Patent Number: 5,572,244

[45] Date of Patent: Nov. 5, 1996

[54] ADHESIVE-FREE EDGE BUTTING FOR PRINTHEAD ELEMENTS

[75] Inventors: Donald J. Drake, Rochester; Hung C. Nguyen, Webster, both of N.Y.

[73] Assignee: Xerox Corporation, Stamford, Conn.

[21] Appl. No.: 280,973

[22] Filed: Jul. 27, 1994

[51] Int. Cl.$^6$ .............................. G01D 15/18; B41J 2/16; B41J 2/14

[52] U.S. Cl. .............................. 347/42; 29/890.1; 29/611; 347/63

[58] Field of Search ........................ 347/42, 63; 29/890.1, 29/611

[56] References Cited

U.S. PATENT DOCUMENTS

| | | | |
|---|---|---|---|
| Re. 32,572 | 1/1988 | Hawkins et al. | 156/626 |
| 4,678,529 | 7/1987 | Drake et al. | 156/234 |
| 4,774,530 | 9/1988 | Hawkins | 346/140 |
| 4,829,324 | 5/1989 | Drake et al. | 346/140 |
| 5,000,811 | 3/1991 | Campanelli | 156/264 |
| 5,160,403 | 11/1992 | Fisher et al. | 156/633 |
| 5,198,054 | 3/1993 | Drake et al. | 156/64 |
| 5,221,397 | 6/1993 | Nystrom | 156/273.5 |

FOREIGN PATENT DOCUMENTS

| | | | |
|---|---|---|---|
| 0511200 | 5/1993 | Japan | 347/63 |

*Primary Examiner*—Valerie A. Lund
*Attorney, Agent, or Firm*—Daniel J. Krieger

[57] ABSTRACT

A large array or pagewidth printhead fabricated from printhead elements or subunits having adhesive-free butting edges. Each of the printhead elements includes a heater element and a channel element bonded together by an adhesive such as an epoxy. A space or adhesive-receiving aperture is formed between the channel element and the heater element before mating so that any adhesive forced from between the channel element and heater element by the pressure of mating does not flow onto the butting surfaces, but instead overflows into the space thereby maintaining an adhesive free butting edge. The channel element includes an etch trough which forms the space. The printhead elements are butted together to form a large array printhead. The absence of adhesive on the butting edges improves manufacturability of the large array printhead.

20 Claims, 8 Drawing Sheets

ADHESIVE-FREE EDGE BUTTING FOR PRINTHEAD ELEMENTS

FIELD OF THE INVENTION

This invention relates generally to thermal ink jet printheads and more particularly to butted arrays of thermal ink jet printheads which have adhesive-free butting edges.

BACKGROUND OF THE INVENTION

Drop-on-demand thermal ink jet printers are generally well known, and in such systems, a thermal ink jet printhead comprises one or more ink filled chambers communicating with an ink supply chamber and an array of channels having open ends. A plurality of thermal transducers or heaters, usually resistors, are located beneath the channels at a predetermined location relative to the channels. The resistors are individually addressed with a current pulse thereby raising the temperature of the resistor and vaporizing the ink in contact with the resistor. A bubble is formed due to the heating of the ink. As the bubble grows, the ink bulges momentarily from the open end of the channel restrained by the surface tension of the ink as a meniscus. As the bubble begins to collapse due to a drop in temperature of the resistor, the ink between the channel opening and the bubble starts to move towards the collapsing bubble, causing a volumetric contraction of the ink in the channel and resulting in the separation of the bulging ink as a droplet. The acceleration of the droplet out of the open end of the channel while the bubble is growing provides the momentum and velocity required for the droplet to travel in a substantially straight line direction towards a recording medium, such as paper.

A typical thermal ink jet printhead for use in an ink jet printer comprises an ink flow directing component, such as an etched silicon substrate which contains a linear array of channels open at one end and a common reservoir in communication with the channels, and a logic and thermal transducer component, such as a substrate which contains a linear array of heating elements, usually resistors, and monolithically integrated logic drivers and control circuitry. The components are aligned and mated with one resistor at each channel being located at a predetermined distance from the channel open end; the channel open ends serving as the droplet expelling channels or nozzles. Power MOS drivers immediately next to and integrated on the same substrate as the array of resistors are driven by the control circuitry, also integrated on the same substrate, that selectively enable the drivers which apply current pulses to the resistors.

One known method of fabricating thermal ink jet printheads is to form a plurality of the ink flow directing components and a plurality of logic, driver, and thermal transducer components on respective silicon wafers, and then aligning and bonding the wafers together, followed by a process for separating the wafers into a plurality of individual printheads, such as by dicing. The individual printheads are used in one common design of printer in which the printhead is moved periodically across a sheet of paper to form the printed image, much like a typewriter. Individual printheads can also be butted together side by side, placed on a supporting substrate, aligned, and permanently fixed in position to form a large array thermal ink jet printhead or a pagewidth array printhead.

Full width printbars composed of collinear arrays of thermal ink jet printhead elements subunit have a number of architectural advantages over staggered offset printbar architecture. One convenient method of fabricating a collinear subunit printbar is to simply butt each printhead element up against an adjacent printhead element. This fabrication method provides positive positioning of the printhead elements and minimizes the nozzle gap between adjacent printhead elements.

In U.S. Pat. No. 4,678,529 to Drake et al., a method of bonding thermal ink jet printhead components together by applying an adhesive to only higher surfaces of a substrate containing ink bearing structures, while all the surfaces of the ink bearing structures are free of adhesive, is described.

U.S. Pat. No. 32,572 to Hawkins et al. describes an ink jet printhead for high resolution printing made by concurrent fabrication of large quantities of printheads from two substrates that are preferably silicon wafers. A plurality of sets of bubble generating heating elements and their addressing electrodes are formed on one substrate and a corresponding plurality of sets of ink channels and their ink supplying manifolds are formed on another substrate.

U.S. Pat. 4,774,530 to Hawkins describes an ink jet printhead having electrode passivation and a means to provide an ink flow path between an ink manifold and individual ink channels by the placement of a thick film organic structure.

U.S. Pat. No. 4,829,324 to Drake et al. describes a large array thermal ink jet printhead and a fabrication process to provide precision assembly of the printhead using a subunit approach.

U.S. Pat. No. 5,000,811 to Campanelli et al. describes a fabrication approach for large array or page width thermal ink jet printheads in which wafer subunits are diced precisely for alignment and subsequent fabrication.

U.S. Pat. No. 5,160,403 to Fisher et al. describes methods of fabricating ink jet printheads which can be butted against an aligning substrate to form an extended staggered array printhead.

U.S. Pat. No. 5,198,054 to Drake et al. describes a fabrication process that will permit precision assembly of large arrays of reading and/or writing bars and thermal ink jet printheads.

U.S. Pat. No. 5,221,397 to Nystrom describes a large array fabrication process for assembly of large arrays of reading and/or writing bars from fully functional subunits, such as thermal ink jet printheads and a means to anchor the subunits to a structural bar in a temporary fashion.

U.S. patent application Ser. No. 08/155,366, filed Nov. 22, 1993 entitled "Printhead Element Butting" to Drake et al. describes the fabrication of large array ink jet printheads having individual printhead elements. Each printhead element includes a heater element and a channel element. Adjacent printhead elements of the large array printhead abut together at either the channel elements or the heater elements.

SUMMARY OF THE INVENTION

In accordance with one aspect of the present invention, there is provided a printhead element for use in a large array ink jet printhead for an ink jet printing device. The printhead element includes a heater element having a first butting edge and a first surface extending from the first butting edge. The printhead element also includes a channel element having a second butting edge and a second surface extending from the second front face and the second butting edge. The channel element is aligned and fixed to the heater element and defines a first space located therebetween along a portion of the first and second butting edges. An adhesive is disposed between the heater element and the channel element.

Pursuant to another aspect of the present invention, there is provided a large array ink jet printhead for an ink jet printing device. The printhead includes a linear array of printhead elements wherein each of the printhead elements includes a heater element having a first butting edge and a second butting edge spaced a distance apart. A first surface extends between the first butting edge and the second butting edge. Each of the printhead elements also includes a channel element having a third butting edge and a fourth butting edge spaced a distance apart. A second surface extends between the third butting edge and the fourth butting edge. The channel element is mated to the heater element to substantially align the first butting edge to the third butting edge and the second butting edge to the fourth butting edge. A first space is defined between the heater elements and channel elements along a portion of the first and third butting edges and a second space is defined along a portion of the second and fourth butting edges. An adhesive is disposed between the heater element and the channel element of each printhead elements. A supporting substrate is attached to the linear array of printhead elements mated together so that each printhead element is maintained in alignment.

Other features of the present invention will become apparent as the following description proceeds and upon reference to the drawings, in which:

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
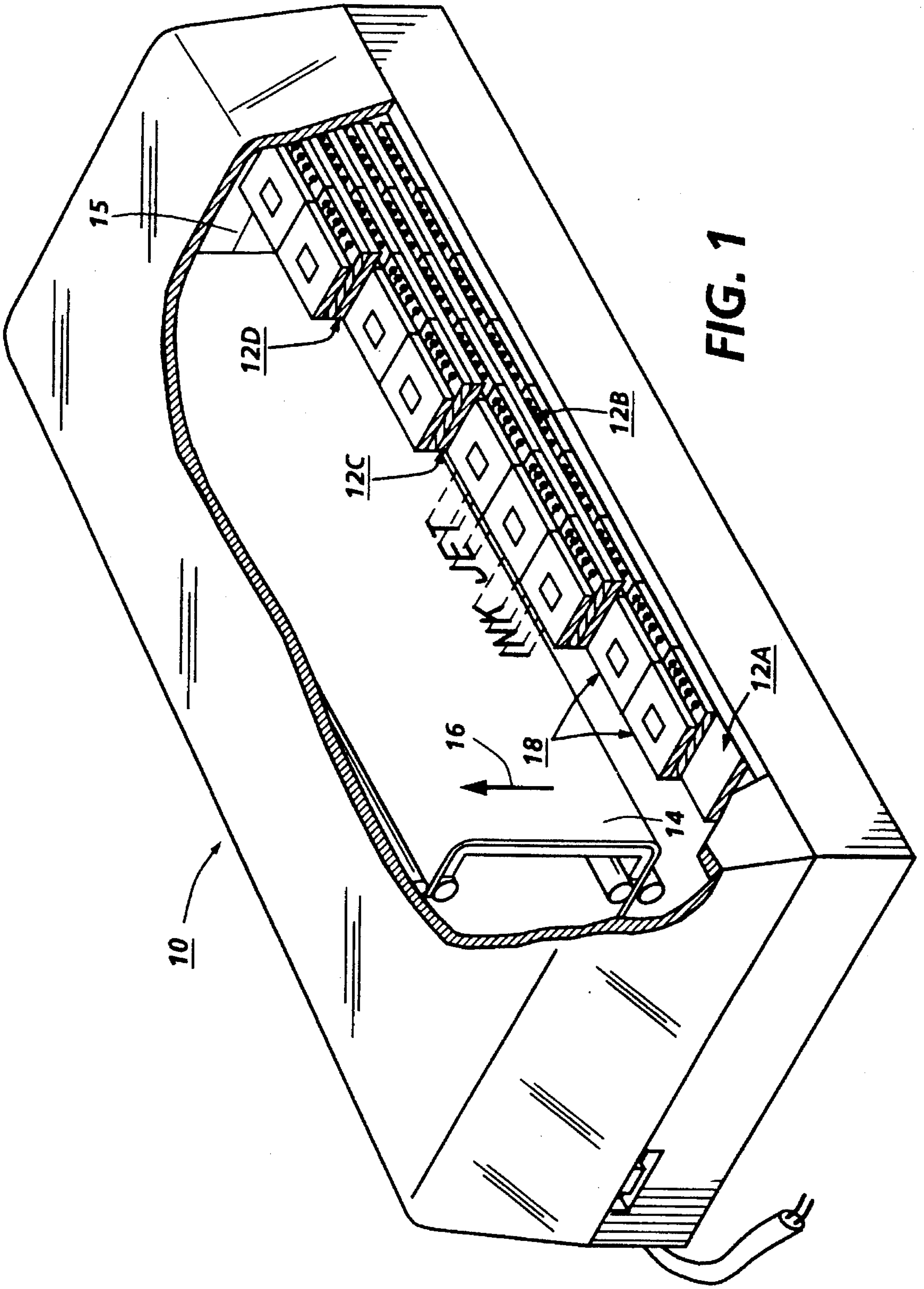
FIG. 1 is a fragmentary perspective view of a multicolor pagewidth type thermal ink jet printer having four pagewidth printbars.

FIG. 1 is a fragmentary perspective view of a pagewidth type, multicolor, thermal ink jet printer 10. In general, a pagewidth monochrome printer has a stationary printbar 12A having a length equal to or greater than the length of a sheet of paper 14. A multicolor pagewidth printer has four stationary printbars 12A, 12B, 12C, 12D stacked one over the other, with the side nozzles of each printbar in alignment with each other. A frame 15 supports the stationary printbars 12A through 12D in spaced relationship with the sheet of paper 14 for printing thereon. The paper 14 is continually moved past the pagewidth printbars in the direction of arrow 16, a direction normal to the printbar length and at a constant speed during the printing process. Refer to U.S. Pat. Nos. 4,463,359 to Ayata et al. and 4,829,324 to Drake et al. for examples of pagewidth printing.

The stationary printbar 12 can be made of any number of individual printheads 18. For instance, a full page width printhead array printing across the short edge of a sheet of 8½"×11" paper could consist of approximately 10 or more individual printheads 18 depending on the number of spots per inch. Likewise, if paper is being printed along the long edge of a sheet of 8½"×11" paper, then the printbar 12 might consist of 15 or more individual printheads 18.

The number of individual printheads 18 comprising the printbar 12A not only depends on the length of the sheet of paper being printed upon but also depends upon the number of channel openings or nozzles in each of the individual printheads 18. Typically, one of the individual printheads 18 can have anywhere from 50 to 300 or more individual nozzles.

Figure 2:
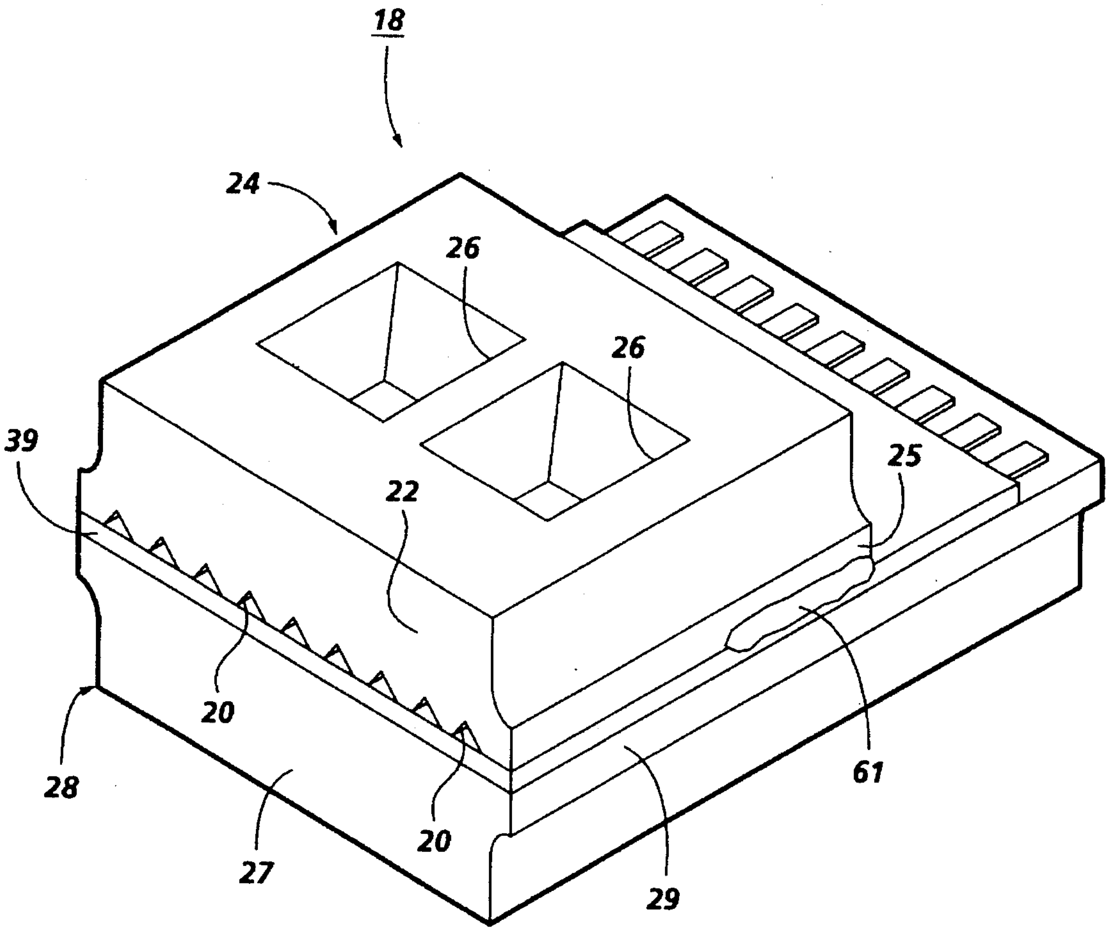
FIG. 2 is a schematic elevational view of a printhead element.

As illustrated in FIG. 2, the printhead element 18 includes a plurality of nozzles 20 arranged in side by side relationship along a front face 22 of a channel element or upper substrate 24. The upper substrate 24 of each individual printhead 18 also includes one or more fill holes 26 which allow for ink to fill the nozzles 20 through capillary action for later deposition upon the sheet of paper 14. In addition, the channel element 24 includes a butting edge 25 which intersects the front face 22. In a pagewidth array, the butting edge 25 contacts the channel element butting edge of an adjacent printhead element 18. While the butting edges have a surface area, the term "butting edge" is used to distinguish over other surfaces described herein.

Located below each of the channel elements 24 is a lower electrical substrate or heating element 28 having a second front face 27 intersecting a butting edge 29. The butting edge 29 contacts the butting edge of the heater element of an adjacent printhead element 18. The heating element 28 includes electrical circuitry for causing ink to be expelled from each of the individual nozzles 20. Any known method may be used to fabricate the individual printhead elements 18. Examples are U.S. Pat. No. 32,572 to Hawkins et al., U.S. Pat. No. 4,774,530 to Hawkins and U.S. Pat. No. 5,000,811 to Campanelli, all incorporated herein by reference.

Figure 3:
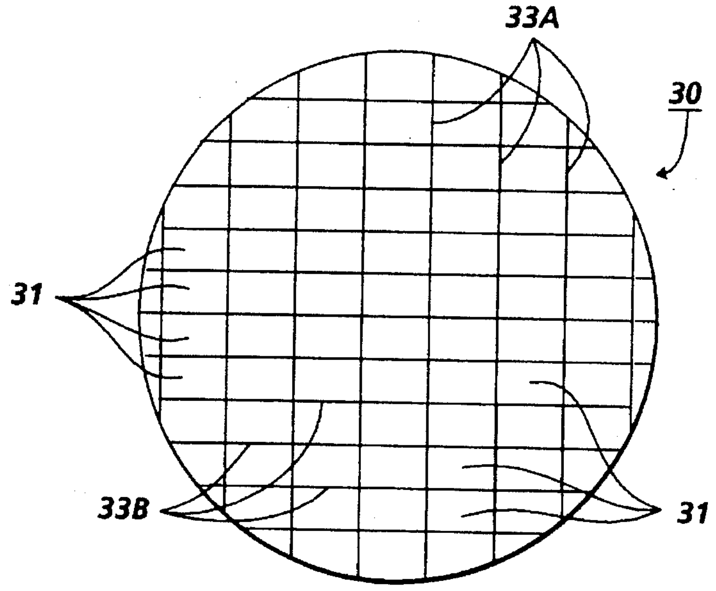
FIG. 3 PRIOR ART
FIG. 3 is a schematic plan view of a silicon wafer having individual elements.

FIG. 3 illustrates a single silicon wafer 30 including a plurality of individual elements 31, which are either channel elements 24 or heater elements 28. One or both sides of the silicon wafer is polished depending on whether heater elements or channel elements are being formed. Each of the individual elements 31 located on the wafer 30 is delineated by vertical separation lines 33A and horizontal separation lines 33B to define the outer edges or boundaries of each of the individual elements 31. Dicing cuts are made at the separation lines 33 to separate one element 31 from an adjacent element 31.

Figure 4:
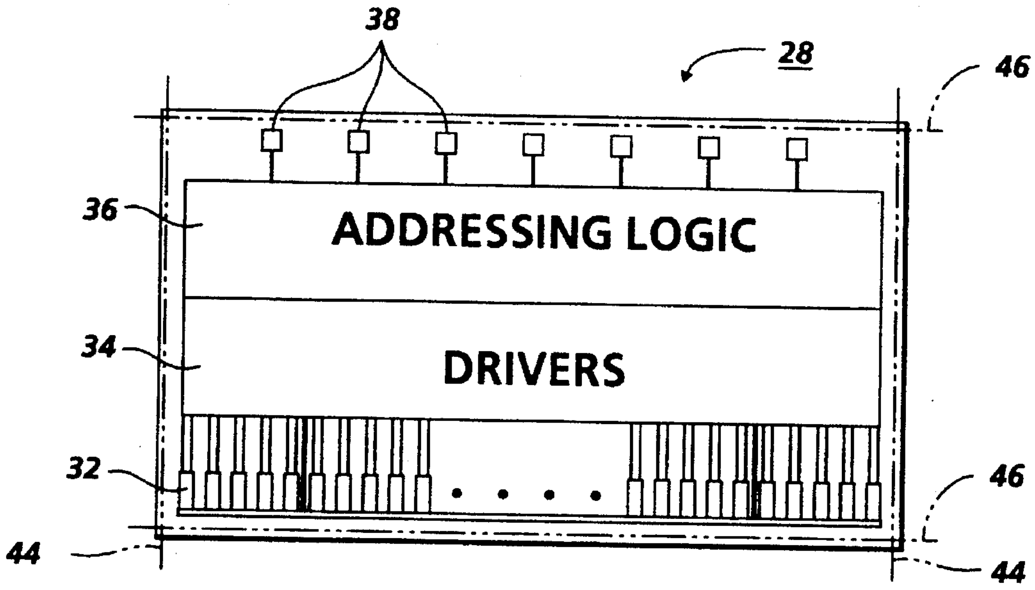
FIG. 4 PRIOR ART
FIG. 4 is a schematic plan view of a heater element.

A single heater element 28 is illustrated in FIG. 4. A plurality of heaters or resistors 32, drivers 34, addressing logic 36 and the electrodes 38 are patterned on the polished surface of a single side polished (100) silicon wafer. The silicon wafer can have up to 256 individual heating elements 28 or more depending on the diameter of the silicon wafer being patterned. Also shown are the respective locations of the addressing logic 36, the drivers 34 and the heaters 32 on the heating element 28. The individual heaters 32 are patterned on the silicon substrate in side by side relationship so that each individual heater will be strategically associated with a corresponding nozzle when the heater element 28 is mated to the channel element 24.

Each of the individual heaters 32 is driven by a portion of the electronic circuitry consisting of semiconductor drivers 34 which are, in turn, driven by logic circuitry 36. The logic circuitry 36, the drivers 34 and the heaters 32 are all formed on the silicon chip by known large scale integrated circuit techniques. The logic circuitry 36 is, in turn, connected to electrode terminals 38 which receive signals through wire bonds connected to electrodes 38. Control circuitry connected to the electrodes 38 selects which of the individual nozzles 20 of the printhead element 18 expel ink. The logic circuitry and driving circuitry which is used to pulse the individual heaters 36 is shown in U.S. patent application Ser. No. 07/971,873 assigned to the present assignee and herein completely incorporated by reference.

A thick film insulating layer 39 (see FIG. 2) such as Vacrel®, Riston®, Probimer®, or polyimide is deposited on top of the circuitry on the heater element 28. The thick film insulating layer 39 is a passivation layer sandwiched between the upper and lower substrates. MOS fabrication techniques are used for multilayer passivation of the logic circuitry and the drivers which will also protect the circuitry from mobile ions and ink similar to the methods disclosed in U.S. Pat. No. 5,010,355 to Hawkins, et al., the pertinent portions of which are herein incorporated by reference.

It is also possible to control the heaters 32 by matrix addressing such as that described in U.S. Pat. Nos. 4,651,164 and 4,985,710. In addition, other forms of switchable addressing circuitry are possible and intended to be in the scope of the invention.

A silicon channel wafer includes a number of channel elements 24 which are formed on the surface of the silicon wafer. One of the individual channel elements 24 is shown in an enlarged view in FIG. 5. The channel wafer used to produce a plurality of channel elements 24 for individual or large array printheads is a two sided polished (100) silicon wafer. After the wafer is chemically cleaned, a silicon nitride layer, not shown, is deposited on both sides.

The channel wafer is photolithographically patterned to form a plurality of channel grooves 42, and one or more fill holes 26. A potassium hydroxide (KOH) anisotropic edge is used to etch the channels 42 and fill holes 26: In this case, the {111} planes of the (100) wafer make an angle of 54.7° with the surface of the wafer. Anisotropic etching is described in U.S. Pat. No. 4,957,592 to O'Neill, the relevant portions of which are incorporated by reference.

Individual printhead elements are made by aligning and joining a heater wafer to a channel wafer. Because each of the individual channel elements 24 and heating elements 28 are patterned on large silicon wafers, each individual element must be separated from its adjoining element on the respective silicon wafer to form a printhead array. For instance, the separation of individual heating elements 28 from the silicon wafer can be accomplished by any number of known dicing operations made along parallel separation lines 44 and 46 (see FIG. 4) which correspond respectively to vertical separation line 33A and horizontal separation line 33B of FIG. 3. This fabrication process, likewise requires that parallel milling or dicing cuts be made at lines 48 and 50 of the channel element 24 of FIG. 5. Dicing along the line 50A creates the nozzles 20.

Figure 6:
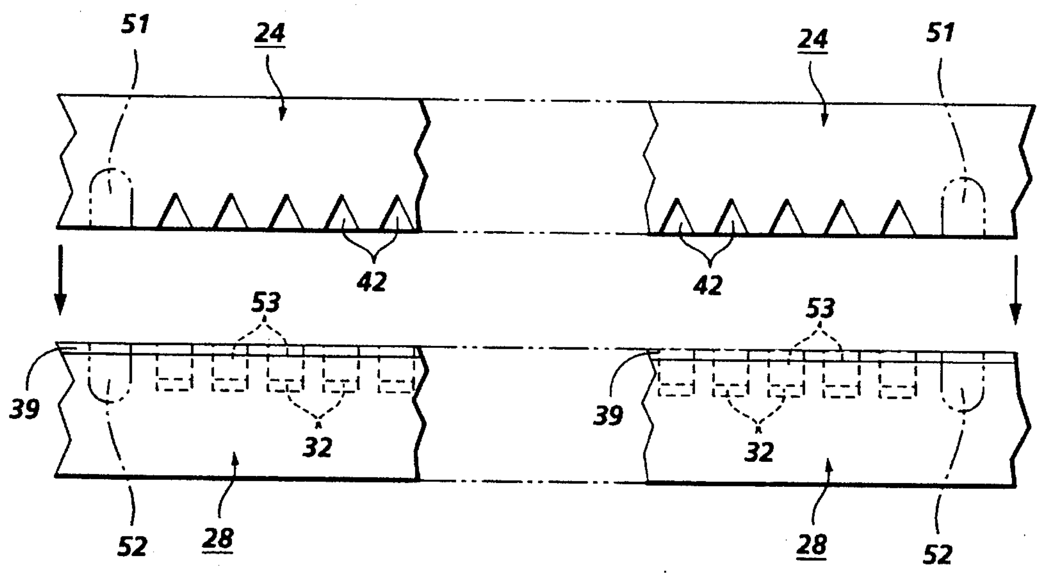
FIG. 6 PRIOR ART
FIG. 6 is a schematic fragmentary elevational view of a channel element wafer and heater element wafer having dice cuts before mating.
Figure 7:
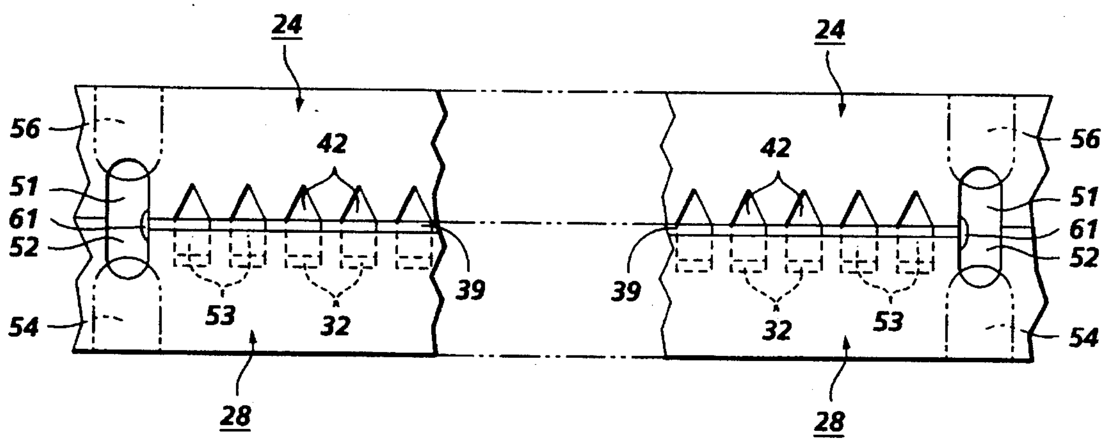
FIG. 7 PRIOR ART
FIG. 7 is a schematic fragmentary elevational view of a channel element wafer bonded to a heater element wafer having dice cuts and back cuts.

FIG. 6 illustrates the heater wafer and the channel wafer before mating, each having respective pre-dicing cuts 51 and 52 which have been made to the mating surfaces of each of the wafers. Pre-dicing cuts have a depth of less than the thickness of the wafer. Once the individual heater wafers and channel wafers have dicing cuts made to the wafer, the channel wafer has an adhesive applied thereto, and is aligned and mated to the heater wafer by a number of techniques including that described in U.S. Pat. No. 4,678,529 to Drake et al. assigned to Xerox Corporation, herein incorporated by reference. The heaters 32 are located beneath heater pits 53, as is known on the art, and centered with respect to corresponding channels 42. FIG. 7 illustrates a further step in the process in which individual printheads are manufactured by placing a back cut 54 and a back cut 56 sufficiently deep to meet the pre-dicing cuts 51 and 52. A single cut through the pre-dicing cuts is also possible. Once cut, individual printheads 18 are separated from the entire two-wafer structure consisting of the channel wafer and the heater wafer.

Figure 5:
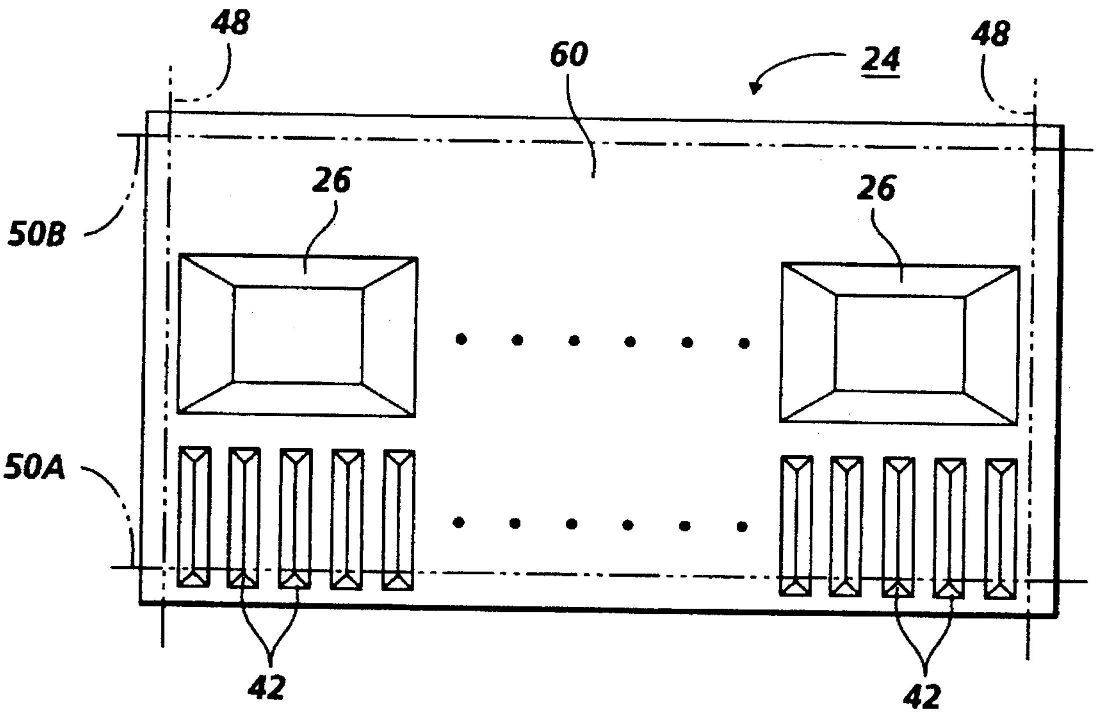
FIG. 5 PRIOR ART
FIG. 5 is a schematic plan view of a channel element.

As previously described, the layer of adhesive or epoxy is placed on the channel wafer before it is mated with the heater wafer. This layer of epoxy has a thickness of approximately 1 micron thick. The epoxy is deposited over the flat unetched surfaces of each of channel elements 24 as shown in FIG. 5. The epoxy covers the flat surface areas between adjacent channels 42, between the channels 42 and the fill holes 26, and a large flat surface 60 between the fill holes 26 and the parallel dicing cut 50B. Flat surface 60 typically remains unetched. Consequently, surface 60 contains a relatively large amount of epoxy with respect to the other areas of the channel element 24. During mating of the channel wafer to the heater wafer, excess epoxy is forced or squeezed by the pressure of mating from between the elements in a mass or blob of excess epoxy 61 as illustrated in FIG. 7. It should be noted that the epoxy does not typically flow out the sides adjacent to the channels 42 or the fill holes 26 since the surface areas containing epoxy in these regions is relatively small but epoxy is likely to flow out adjacent to the flat surface 60. This epoxy flows onto the precision diced edges of the buttable printhead elements 18 thereby causing the butting edges to be nonsmooth. Excess epoxy 61 is also shown in FIG. 2.

Because individual printhead elements 18 are cut and then placed in a large fixture to create an array of printheads, the butting edges must be consistently flat and smooth throughout the entire array to maintain proper alignment and spacing between nozzles of adjacent printhead elements. As seen in the process of FIG. 6 and 7, the method of predicing the channel wafer and the heater wafer does not remove the excess epoxy 61 (see FIG. 7) since the predice cuts 51 and 52 are made before the wafers are mated. Consequently, the excess epoxy must be removed from the printheads 18 before butting by abrading the epoxy or other known means to smooth the now corrupted butting edges. Of course, such a procedure requires additional labor in the manufacturing process and is not desirable.

Figure 8:
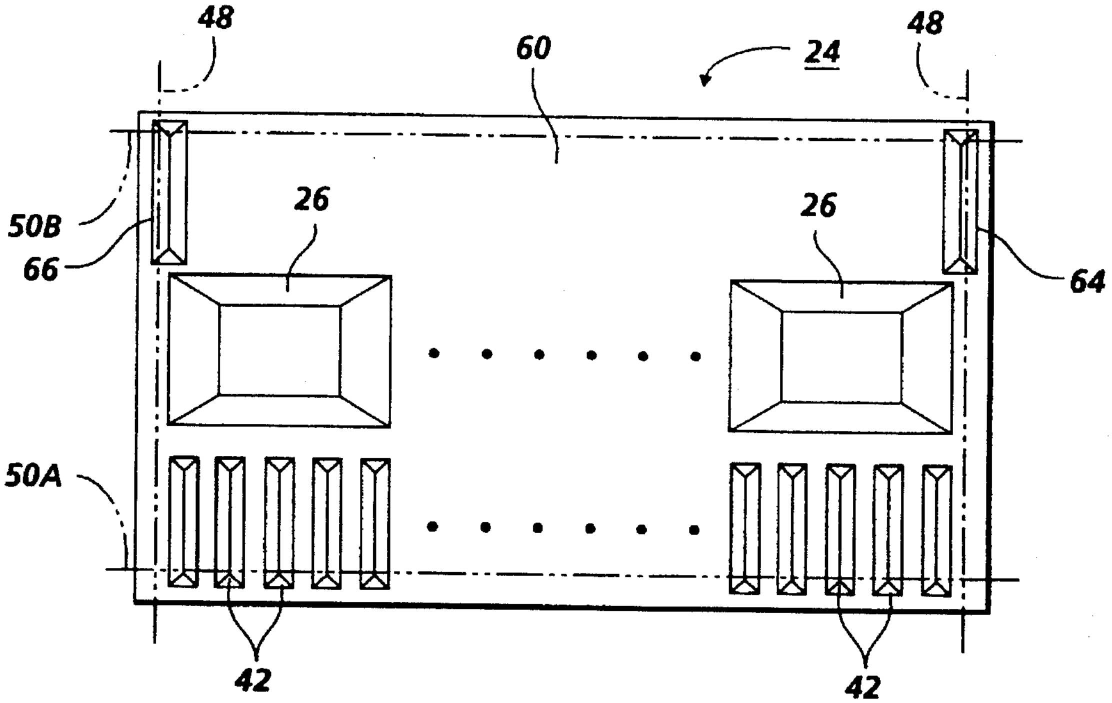
FIG. 8 is a schematic plan view of a channel element having etch troughs.

To prevent excess epoxy from squeezing out or overflowing at the sides of the printhead element, a first overflow trough 64 and a second overflow trough 66 are formed on the surface 60 of the channel element 24 as illustrated in FIG. 8. The first overflow trough 64 and the second overflow trough 66 are located posterior to the fill holes 26. Each of the overflow troughs 64 and 66 are approximately 50 microns wide and actually straddle the separation lines 48. Each etch trough is formed by etching in the same fashion as the channels 42. As previously described the large surface area 60 is a critical area because this largely unetched region of the channel element 24 acquires a relatively large amount of epoxy during manufacture and consequently tends to produce excess epoxy which squeezes out at the butting edges once the channel element 24 is mated to the heater element 28. The parallel separation line 50B as illustrated in FIG. 8 cuts across each of the first etch trough 64 and the second etch trough 66 thereby exposing an open end of each of the etch troughs.

Figure 9:
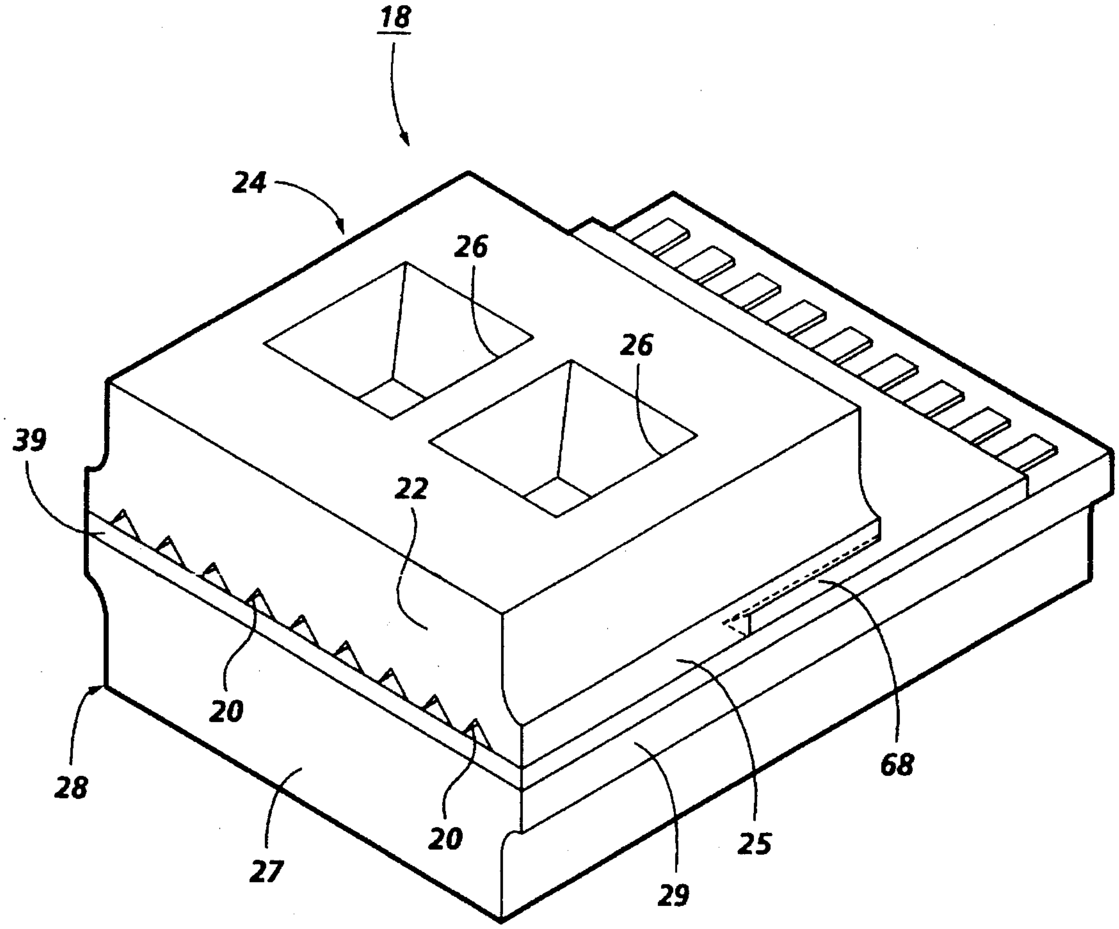
FIG. 9 is a schematic elevational view of a printhead element having a defined space between the channel element and printhead element.

Using the process previously described in FIG. 6 and FIG. 7, the heater wafer and the channel wafer having etch troughs are aligned, prediced, mated, and diced to form the individual printhead elements 18 as illustrated in FIG. 9. Once mated, the printhead element 18 includes a space or adhesive-receiving aperture 68 formed between the channel element 24 and the heater element 28. The first butting edge 25 and the second butting edge 29 still form an essentially flat edge for butting with an adjacent printhead element 18. The space 68, however, now receives adhesive and prevents adhesive from being squeezed onto either the first butting edge 25 or the second butting edge 29.

Figure 10:
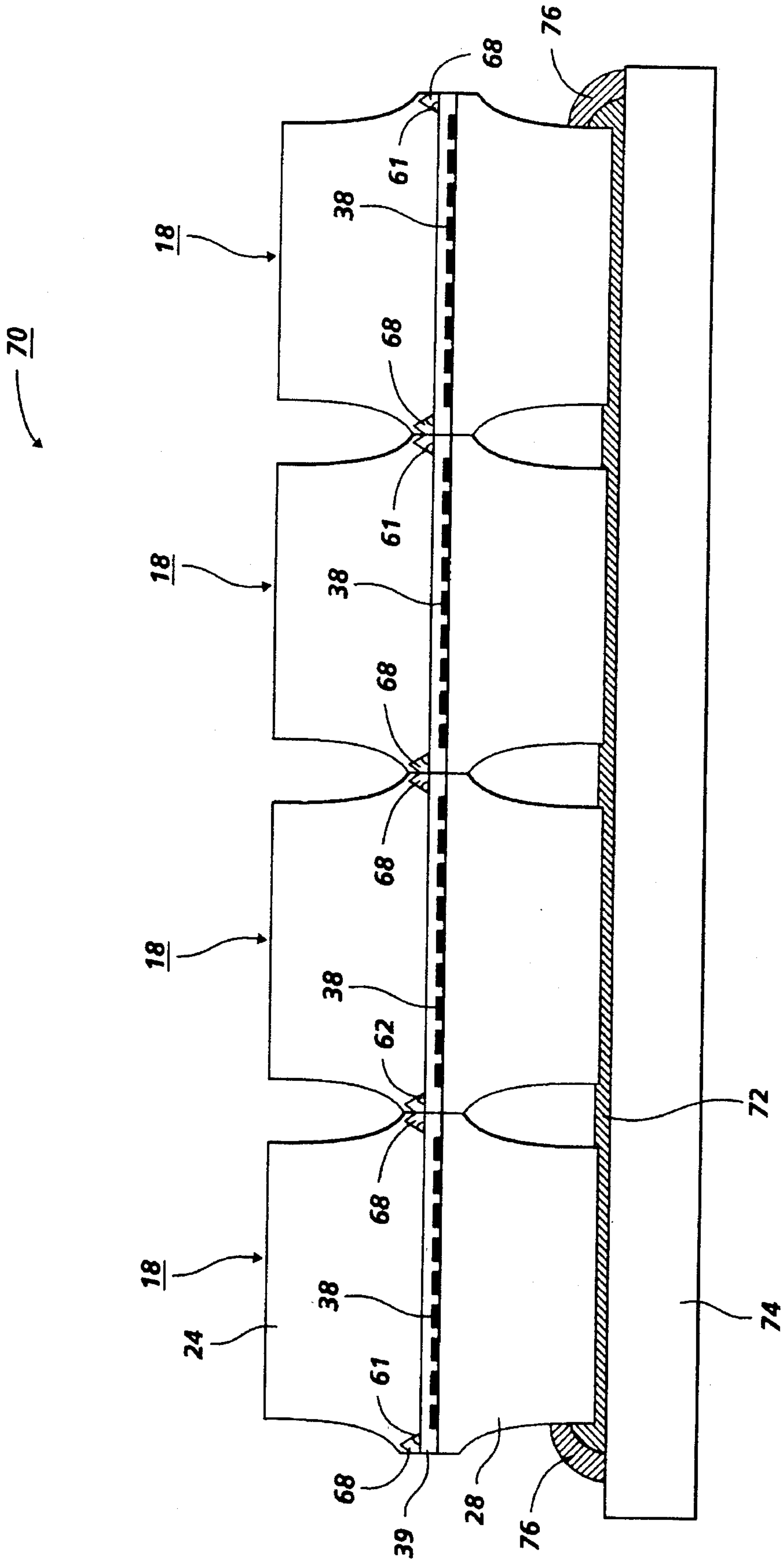
FIG. 10 is a schematic elevational view of the posterior side of a printhead array made of individual printhead elements and a supporting substrate.

FIG. 10 illustrates a posterior view of a large array printbar 70 made of a plurality of the individual printhead elements 18. The individual printhead elements 18 are mated and aligned with other printhead elements 18 to form the large array printbar 70. The printhead elements 18 are placed on a thermo-setting epoxy 72 applied upon a supporting substrate 74. To fix the position of elements 18 until the thermoset epoxy can be used, a UV adhesive droplet 76 is placed at either end of the printhead array. U.S. Pat. No. 5,221,397 to Nystrom describes the fabrication of printbar arrays assembled from subunits and is herein incorporated by reference. As can be seen, the space 68 created by the etch trough receives any excess epoxy 61 which would otherwise flow from between the channel element 24 and heater element 28. The excess epoxy is still squeezed out from between the channel element and the heater element, but due to the space 68, none of the epoxy flows over either the butting edge 25 or the butting edge 29. Consequently, by forming a space between the channel element 24 and the heater element 28 just inside where the heater element butting edge and channel element butting edge meet, problems resulting from epoxy squeeze-out are eliminated or substantially reduced.

In recapitulation, there has been described an adhesive-free butting edge for printhead elements which are butted together to form large array printheads. It is therefore apparent that there has been provided in accordance with the present invention a space formed between elements of a printhead element that fully satisfies the aims and advantages hereinbefore set forth. While this invention has been described in conjunction with a specific embodiment thereof, it is evident that many alternatives, modifications and variations will be apparent to those skilled in the art. For instance, the etch trough can be made of many different sizes and lengths and need not extend to the point where the dicing cut opens the etch trough at the posterior end of the printhead element. Likewise, it is also possible that the etch trough could be formed so that, in cross-section, the apex of the triangle is bisected by the predice cut. Furthermore, a single etch trough could be formed at the boundaries between adjacent channel elements, so that a single etch trough could function, when bisected by the pre-dicing and dice cuts, as an adhesive-receiving feature for two channel elements. Accordingly, it is intended to embrace all such alternatives, modifications and variations that fall within the spirit and broad scope of the appended claims.

We claim:

1. A printhead element for use in a large array ink jet printhead, comprising:

a heater element;

a channel element in butting engagement with said heater element and defining a first overflow trough therebetween; and a layer of adhesive disposed between said heater element and said channel element with excess adhesive flowing into the first overflow trough therebetween, said heater element including a first butting edge and a first surface extending from said first butting edge, said channel element including a second butting edge in substantial alignment with said first butting edge and a second surface extending from said second butting edge, and the first overflow trough located along a portion of said first butting edge and said second butting edge, said second surface defining the first overflow trough, and said second surface further defining an array of channels and at least one reservoir, said at least one reservoir located behind said army of channels, and the first overflow trough located behind said at least one reservoir.

2. The printhead element of claim 1, wherein the first overflow trough is formed is said second surface by isotropic etching.

3. A printhead element for use in a large array ink jet printhead, comprising:

a heater element;

a channel element in butting engagement with said heater element and defining a first overflow trough therebetween; and a layer of adhesive disposed between said heater element and said channel element with excess adhesive flowing into the first overflow trough therebetween, said heater element including a first butting edge and a first surface extending from said first butting edge and a fourth butting edge spaced a distance from said first butting edge and substantially parallel thereto, said channel element including a second butting edge in substantial alignment with said first butting edge and a second surface extending from said second butting edge and a third butting edge spaced a distance from said second butting edge and substantially parallel thereto, the first overflow trough located along a portion of said first butting edge and said second butting edge, said first surface defining a with said second surface a second overflow trough located between said first and second surfaces along a portion of said third and fourth butting edges, said second surface defining the first overflow trough and the second overflow trough, and said second surface defining an array of channels and at least one reservoir, said reservoir located behind said array of channels, the first overflow trough located behind said at least one reservoir and the second overflow trough located behind said at least one reservoir.

4. The printhead element of claim 3, wherein the first overflow trough is formed in said second surface by isotropic etching.

5. The printhead element of claim 4, wherein the second overflow trough is formed in said second surface by isotropic etching.

6. A large array ink jet printhead comprising:

a linear array of printhead elements, each of said printhead elements abutting an adjacent printhead element, each of said printhead elements including a heater element, a channel element in butting engagement with said heater element and defining a first overflow trough therebetween, said channel element and said heater element define a second overflow trough therebetween, and a layer of adhesive disposed between said heater element and said channel element with excess adhesive flowing into the first overflow trough, wherein said heater element includes a first butting edge and a second butting edge spaced a distance apart, and a first surface extending between said first and second butting edges, said channel element includes a third butting edge substantially aligned to said first butting edge and a fourth butting edge substantially aligned to said second butting edge, and a second surface extending between said third and fourth butting edges, the first overflow trough located along a portion of said first butting edge and said second butting edge and the second overflow trough located along a portion of said third butting edge and said fourth butting edge;and a supporting substrate attached to said linear array of printhead elements such that each of said printhead elements is maintained in alignment.

7. The large array ink jet printhead of claim 6, wherein each of said second surfaces defines the first overflow trough.

8. The large array ink jet printhead of claim 6, wherein each of said second surfaces defines the second overflow trough.

9. The large array ink jet printhead of claim 6, wherein each of said second surfaces defines the first overflow trough and the second overflow trough.

10. The large array ink jet printhead of claim 9, wherein each of said second surfaces defines an array of channels and at least one reservoir, said at least one reservoir located behind said array of channels, and the first overflow trough and the second overflow trough located behind said at least one reservoir.

11. The large array ink jet printhead of claim 10, wherein the first overflow trough is formed in said second surface by isotropic etching.

12. The large array ink jet printhead of claim 11, wherein the second overflow trough is formed in said second surface by isotropic etching.

13. An ink jet printer for printing on a recording medium, comprising:

a large array printbar including an array of printhead elements, each of said printhead elements having a first butting edge, a first overflow trough located along a portion of said first butting edge, a second butting edge, and a second overflow trough located along a portion of said second butting edge, each of said printhead elements contacting an adjacent printhead element at an interface defined by said first and second butting edges, said printhead elements including a heater element, and a channel element in butting engagement with said heater element and defining the first overflow trough and the second overflow trough therebetween, and a layer of adhesive disposed between said heater element and said channel element with excess adhesive flowing into the first overflow trough and the second overflow trough; and a frame supporting said large array printbar in spaced relationship with the recording medium.

14. The ink jet printer of claim 13, wherein said said first overflow trough is located adjacent to said second overflow trough at said interface.

15. A method of fabricating a channel element from a substrate for an ink jet printhead element of a large array ink jet printhead, comprising the steps of:

delineating the substrate into a plurality of individual channel elements having substantially parallel side boundaries spaced a distance apart and substantially parallel front and back boundaries spaced a distance apart perpendicular to the substantially parallel side boundaries;

forming a plurality of substantially parallel channels in each of the individual channel elements parallel to the substantially parallel side boundaries and towards the front boundary;

forming at least one reservoir in each of the individual channel elements between the plurality of substantially parallel channels and the back boundary; and forming a first adhesive receiving aperture in each of the individual channel elements substantially parallel to and along a portion of one of the side boundaries between the at least one reservoir and the back boundary to receive excess adhesive.

16. The method of claim 15, further comprising the step of:

forming a second adhesive receiving aperture in each of the individual channel elements parallel to and along a portion of the other of the side boundaries between the at least one reservoir and the back boundary.

17. A method of fabricating a printhead element for a large array ink jet printhead, from a first substrate having a mating surface and a second substrate having a mating surface, the method comprising the steps of:

delineating the first substrate into a plurality of individual channel elements having substantially parallel side boundaries and substantially parallel front and back boundaries perpendicular to the parallel side boundaries;

forming a plurality of substantially parallel channels parallel to the side boundaries and towards the front boundary on the mating surface of the first substrate;

forming at least one reservoir in each of the channel elements between the parallel channels and the back boundary in the first substrate;

forming a first adhesive-receiving aperture in each of the channel elements on the mating surface of the first substrate between the at least one reservoir and the back boundary along a portion of one of the side boundaries;

delineating the second substrate into a plurality of individual heater elements having substantially parallel side boundaries and substantially parallel front and back boundaries perpendicular to the parallel side boundaries;

forming on each of the individual heater elements an array of heaters and associated addressing electrodes for selectively addressing individual heaters on the mating surface;

cutting through the mating surface of the first substrate along the side boundaries to a depth less than the thickness thereof;

cutting through the mating surface of the second substrate along the side boundaries to a depth less than the thickness thereof;

aligning the channels formed on the first substrate to the heaters on the second substrate;

applying a layer of adhesive between the first substrate and the second substrate;

butting the first substrate to the second substrate with excess adhesive flowing in the first receiving aperture;

cutting through the predicing cuts of the first substrate and the second substrate to separate the mated first substrate and second substrate along the side boundaries; and cutting through the first substrate and the second substrate along the front and back boundaries to separate the mated first substrate and second substrate along the front and back boundaries.

18. The method of claim 17, further comprising the step of:

forming a second adhesive-receiving aperture between the at least one reservoir and the back boundary parallel to and along a portion of the other of the side boundaries in each of the channel elements so that excess adhesive flows in the second adhesive receiving aperture during the butting step.

19. A method of fabricating a large array ink jet printhead, from a plurality of printhead elements, each of the printhead elements including a channel element having parallel side boundaries and parallel front and back boundaries and a heater element having parallel side boundaries and parallel front and back boundaries, comprising the steps of:

forming a plurality of channel elements each having a plurality of substantially parallel channels parallel to the side boundaries and towards the front boundary, at least one reservoir in each of the channel elements between the parallel channels and the back boundary, and a first adhesive receiving aperture between the at least one reservoir and the back boundary along a portion of one of the side boundaries;

forming a plurality of heater elements each having an array of heaters and associated addressing electrodes for selectively addressing individual heaters;

aligning the channels on the channel elements to the heaters on the heater elements;

applying a layer of adhesive between the channel elements and the heater elements;

butting the channel elements to the heater elements to form a printhead element with excess adhesive flowing in the first adhesive receiving aperture;

placing the printhead elements in an abutting relationship on a supporting substrate.

20. The method of claim 19, further comprising the step of:

forming a second adhesive-receiving aperture between the at least one reservoir and the back boundary parallel to and along a portion of the other of the side boundaries in each of the channel elements in an abutting printhead element with excess adhesive flowing in the second adhesive receiving aperture during the butting step.

* * * * *